United States Patent
Thisted

(10) Patent No.: US 8,415,817 B2
(45) Date of Patent: Apr. 9, 2013

(54) WIND FARM

(75) Inventor: Jan Thisted, Tjele (DK)

(73) Assignee: Siemens Aktiengesellschaft, München (DE)

( * ) Notice: Subject to any disclaimer, the term of this patent is extended or adjusted under 35 U.S.C. 154(b) by 946 days.

(21) Appl. No.: 11/974,886

(22) Filed: Oct. 16, 2007

(65) Prior Publication Data

US 2008/0088131 A1    Apr. 17, 2008

(30) Foreign Application Priority Data

Oct. 17, 2006  (EP) ...................................... 06021769

(51) Int. Cl.
*H02J 3/42* (2006.01)

(52) U.S. Cl. .......................................................... 290/44

(58) Field of Classification Search ...................... 290/44
See application file for complete search history.

(56) References Cited

U.S. PATENT DOCUMENTS

| | | | | |
|---|---|---|---|---|
| 1,380,961 A * | 6/1921 | Hobart | ............................... | 363/8 |
| 2,010,364 A * | 8/1935 | Hiss | ............................... | 363/174 |
| 2,116,899 A * | 5/1938 | Kalsey | ........................... | 363/108 |
| 2,137,990 A * | 11/1938 | Rossman | ...................... | 363/174 |
| 4,556,801 A * | 12/1985 | Gervasio et al. | ................. | 290/44 |
| 4,663,536 A * | 5/1987 | Roesel et al. | ..................... | 290/7 |
| 4,870,339 A * | 9/1989 | Furukawa et al. | ............... | 322/29 |
| 5,083,039 A | 1/1992 | Richardson et al. | | |
| 6,906,447 B2 * | 6/2005 | Leijon et al. | ................... | 310/196 |
| 7,259,491 B2 * | 8/2007 | Leijon et al. | ................... | 310/196 |

FOREIGN PATENT DOCUMENTS

| WO | WO 01/69754 A1 | 9/2001 |
|---|---|---|
| WO | WO 03/025390 A1 | 3/2003 |
| WO | WO 03/025391 A1 | 3/2003 |

* cited by examiner

*Primary Examiner* — Joseph Waks

(57) ABSTRACT

A wind turbine including a rotor mechanically coupled with a wind turbine generator for transforming mechanical power into electrical power, the generator including a generator output for putting out the electrical power, a wind farm output node being adapted to be electrically coupled with a utility grid, a converter including at least one electric motor with a stator and a rotor and a converter generator with a stator and a rotor the stator of the motor being electrically coupled with the generator output and the stator of the converter generator being electrically coupled with the wind farm output node and the rotor of the motor and the rotor of the converter generator being mechanically coupled with each other.

14 Claims, 2 Drawing Sheets

WIND FARM

CROSS REFERENCE TO RELATED APPLICATIONS

This application claims priority of European Patent Office application No. 06021769.2 filed Oct. 17, 2006, which is incorporated by reference herein in its entirety.

FIELD OF INVENTION

The present invention relates to a wind farm comprising at least one wind turbine including a rotor mechanically coupled with a wind turbine generator for transforming mechanical energy into electrical energy and which further comprises an output node being adapted to be electrically coupled with a utility grid.

BACKGROUND OF THE INVENTION

Over the last decade the fraction of energy added to power grids by wind farms has increased significantly. Therefore, there is also an increased need for controlling wind farms delivering energy to utility grids with respect to a number of parameters which are important for the utility grid to work faultlessly. In addition to the voltage and the frequency of the power delivered to the utility grid, it may also be important to provide, on request of the utility system operator, a certain reactive power or a certain power factor. The reactive power is the power needed by inductive and capacitive users to build up their magnetic and electric fields, respectively. With an alternating current such magnetic and electric fields will be built up and down periodically, which leads to a reactive power flow from and to the electric generators. The power factor is the cosine of the phase angle between voltage and current.

Variations in the demand for reactive power in the utility grid need to be compensated through reactive power provided by the power generators. As long as the power delivered to the utility grids by wind farms was only a minor fraction of the total power delivered to the grids, there was no need to react to the reactive power demands or power factor demands of the grid by the wind farms. However, with increasing fraction of power fed into utility grids by wind farms, the dynamic power factor control or a dynamic reactive power control of wind farms, in addition to voltage control and frequency control, becomes more and more important.

Dynamic power factor control of wind farms is often implemented with capacitors banks mounted in individual wind turbines. Capacitors are switched on and off the grid to provide such reactive power as is required to meet the specified power factor. Dynamic power factor control may also be implemented by an arrangement where the individual wind turbines are equipped with a power electronic converter that converts part or whole of the electricity supplied by the wind turbine. The power electronic converter of the individual wind turbine is programmed to control the power factor of the electricity supplied by the wind turbine.

For both types of power factor control system the desired power factor is typically provided as a signal from a central SCADA (Supervise Control and Data Acquisition) system. The utility system operator dispatches a request to the wind farm for a certain power factor and the central SCADA system forwards the power factor request to the individual wind turbines, either directly or after modification, to compensate for the power factor contribution of the wind farm electrical infrastructure. The power factor is controlled locally at the individual wind turbines by adjustment of the power factor of the electricity supplied by the individual wind turbines to correspond to the power factor requested by the SCADA system. Such an arrangement for dynamic power control is, e.g., described in U.S. Pat. No. 5,083,039, which describes a wind turbine with dynamic power factor control, sending control signals to power electronic converters of wind turbines. The power electronic converters are then locally controlled such that the power factor delivered by the local wind turbine is shifted through changing the ratio of active and reactive current supplied to the grid by the inverter module of the power electronic converter.

A dynamic power factor control system as outlined above requires a SCADA system with functional and fast-reacting connections to the individual wind turbines. If the individual communication of the wind farm is slow or deficient, the dynamic power control will not function faultlessly. Further, unless all turbines are operating at the same active power output, which will rarely be the case if the wind speed is not sufficiently high to cause all wind turbines of the farm to operate at rated capacity, the reactive power supplied by an individual wind turbine will change proportionally with the active power supplied by the individual wind turbine. This means that some wind turbines will provide significantly larger proportion of reactive power than others, which in turn leads to current flow in the wind farm that is less balanced and causes higher losses than what could be achieved with more balanced current flow.

Moreover, power converters and/or dynamic capacitor systems can lead to harmonic disturbances in the electrical power delivered by the wind turbines. Those harmonic disturbances need to be controlled by substantial, power-consuming filters in order to meet the harmonics requirements of the grid.

SUMMARY OF INVENTION

It is therefore an objective of the present invention to provide a wind farm in which the extent of the above-mentioned problems is reduced.

This objective is solved by a wind farm according to the claims.

An inventive wind farm comprises at least one wind turbine including a rotor mechanically coupled with the wind turbine generator for transforming mechanical energy into electrical energy. The generator comprises a generator output for putting out the electrical energy. The wind farm further comprises a wind farm output node being adapted to be electrically coupled with a utility grid. Moreover, the wind farm comprises a converter with at least one electric motor with a stator and a rotor and a converter generator with a stator and a rotor. A stator of the motor is electrically coupled (either directly or indirectly) with the generator output and the stator of the converter generator is electrically coupled (either directly or indirectly) with the wind farm output node. The rotor of the motor and the rotor of the converter generator are mechanically coupled with each other.

The mechanical coupling of the rotors allows for a full galvanic separation between the wind farm generators one side and the output node at the other side. Hence, the wind farm is galvanically separated from the utility grid. Due to the galvanic separation the quality of the electrical power at the wind farm side becomes irrelevant in relation to the grid code requirements of the utility grid, i.e. the specifications which have to be fulfilled for electrical power which is to be fed into the utility grid. This means that the wind farm can operate at any harmonic distortion and at any power factor. The only limitations being those set by the wind farm equipment itself.

As a consequence, savings can be made on the wind turbine power converters, using cheaper active switches and substantially reducing the filter system equipment.

Moreover, during fault ride through situations the generator of the rotating converter acts as a spinning reserve, thereby meeting all grid code requirements. The fault response on the wind farm can be adjusted to best serve the requirements of the wind turbines.

In an advantageous embodiment of the invention, the electric motor is a synchronous motor and the converter generator is a synchronous generator. This means that the rotor of the generator is rotating with the grid frequency of the utility grid while the rotor of the electric motor is rotating with the frequency of the electrical power at the wind part side. Although a gear could, in general, be present in the mechanical coupling, it is advantageous to use a rigid shaft for rigidly coupling both rotors. In this case both rotors must rotate with the same frequency. As the rotor of the generator rotates with a utility grid frequency the rotor of the electrical motor also rotates with the same frequency. As a consequence, the frequency of the electrical power at the wind farm side is the same as the frequency of the utility grid, or has an integer relationship thereto. An integer relationship can be achieved when the rotor of the electrical motor and the rotor of the generator have a different number of poles. For example, if the number of poles in the generator is twice as high as in the rotor of the electrical motor, the frequency of the electrical power at the wind farm side is half the frequency of the electrical power at the utility grid side. This offers the opportunity to operate the wind farm at a different frequency than the utility grid.

In order to help start the synchronous motor or generator, a start up motor may be present in the energy converter.

A voltage transformer, e.g. a step-up transformer, may be interconnected between the converter generator and the wind farm output node in order to match the utility grid voltage.

The wind farm may consist of, in general, more than one wind turbine. In such a case wind turbines are connected to an internal wind farm grid with an internal node to which the generator outputs of all wind turbines are connected. Then, the stator of the electric motor is electrically connected to the internal node.

Alternatively, the wind farm may also comprise more than one energy converters. In this case, the stators of the electric motors of different energy converters are connected to generator outputs of different wind turbines. The stators of the converter generators are electrically connected to the wind farm output node.

In a third alternative, the converter may comprise more than one electric motor and a number of converter generators which is less then the number of motors, for example, only one converter generator for two motors. In this case, the stators of different electric motors are connected to generator outputs of different wind turbines. Moreover, the mechanical coupling includes more than one mechanical coupling device each coupling device mechanically coupling a rotor of one of the electric motors with the rotor of the converter generator. Although in principle possible, this embodiment may be less preferable because of the high complexity of the mechanical coupling.

The wind farm may comprise at least one control device being connected to the electric motor and/or the converter generator. The control device is designed such as to produce control signals on the basis of a request set value relating to the electrical power to be output from the wind farm output node and such as to output the control signals to the at least one electric motor and/or the converter generator. By means of the control device it becomes possible to perform voltage control and/or power factor control at the converter. Grid codes are thus fully matched with the inventive wind farm by using suitable control software and/or hardware.

BRIEF DESCRIPTION OF THE DRAWINGS

Further features, properties and advantages of the present invention will become clear from the following description of an embodiment in conjunction with the accompanying drawings.

DETAILED DESCRIPTION OF INVENTION

Figure 1:
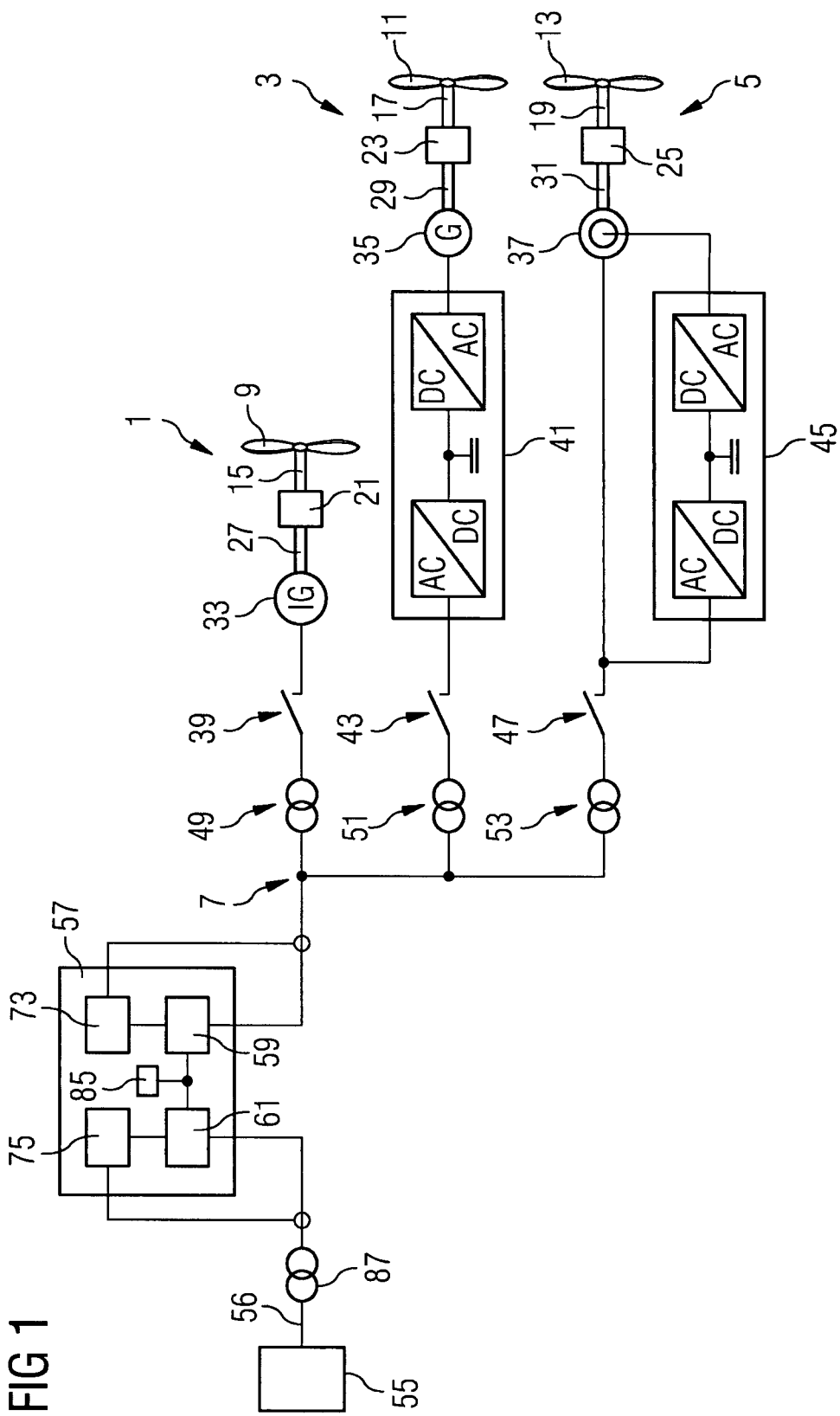
FIG. 1 shows a plan of an inventive wind farm.

A plan of an inventive wind farm is shown in FIG. 1. In this plan the wind farm comprises three wind turbines 1, 3, 5 which are implemented with different generators and different couplings with an internal grid of the wind farm. It shall be noted that the number of wind turbines can be more than or less than three and that the different implementations are primarily chosen in order to show that different kinds of wind turbine generators and couplings with an internal grid are possible. However, it is not necessary to have different implementations in one wind farm. In particular, all wind turbines and all couplings to the internal grid can also be implemented in the same way.

The wind farm shown in FIG. 1 comprises three wind turbines 1, 3, 5 which are all electrically connected to an internal node 7 of the wind farm's internal grid.

Each wind turbine 1, 3,5 comprises a rotor 9, 11, 13 with a rotor shaft 15, 17, 19 transmitting the torque of the turning rotor 9, 11, 13 to an optional gear box, 21, 23, 25. In the gear boxes 21, 23, 25, a transmission of the rotation to an output shaft 27, 29, 31 with a certain transmission ratio takes place.

Each output shaft 27, 29, 31 is fixed to the rotor of an AC generator which transforms the mechanical power provided by the rotation of the output shaft 27, 29, 31 into electrical power. The AC generator may either be a synchronous generator or an asynchronous generator. In a synchronous generator, the rotor rotates with the same rotational frequency as the rotating magnetic field produced by the stator of the generator or with an integer relationship with the frequency of the rotating magnetic field, depending on the number of poles present in the rotor. In contrast, in an asynchronous generator the rotational frequency of the stator's magnetic field is different to the rotational frequency of the rotor. The difference in rotational frequency is described by the slip of the asynchronous generator. The generators 33, 35, 37 are variable speed generators, i.e. the rotational speeds of the rotors are allowed to vary depending on the wind conditions.

The first wind turbine 1 is shown to be directly connected to the internal node 7 of the wind farm's internal grid. The generator 33 of the first wind turbine 1 is an asynchronous generator which means that the rotor 9 can rotate with a rotational speed which is more or less independent of the frequency of the power in the internal grid. However, it is also possible to use a synchronous motor which would mean that the frequency of the internal grid and the rotational frequency of the rotor 9 would be identical or would have an integer relationship if a gearbox is used. The first wind turbine 1 can be connected to and disconnected from the internal node 7 by a switch 39.

The second wind turbine 3 is connected to the internal node 7 of the wind farm's internal grid via a frequency converter 41 which converts the frequency of the electrical power delivered by the generator 35 into an electrical power having a fixed frequency which corresponds to the frequency at the internal grid of the wind farm. In this case the generator is a synchronous generator so that the frequency of the electricity delivered by the generator varies with the rotational frequency of the wind turbines rotor 11. However, by transforming the AC power delivered by the synchronous generator into DC power and converting the DC power back into AC power, the frequency of the generator can be converted into the frequency of the internal grid. Moreover, the power electronic converters can be implemented such as to be able to control the output voltage of the electrical power supplied by the wind turbine to correspond to a specific voltage set point. The second wind turbine 3 can be connected to and disconnected from the internal node 7 via a second switch 43.

The third wind turbine 5 comprises a doubly fed asynchronous generator 37. In such a generator the stator is directly coupled with the internal grid of the wind farm whereas the rotor is coupled with the internal grid via a frequency converter 45. By providing a suitable frequency of the electrical power at the rotor side of the converter, slip of the converter can be controlled. The third wind turbine 5 can be connected to and disconnected from the internal node 7 of the internal grid of the wind farm via a switch 47.

Between each switch 39, 43, 47 and the internal node 7 a transformer 49, 51, 53 is present for converting the voltage delivered by the generators 33, 35, 37 to the internal grid voltage at the internal node 7.

The internal node 7 is connected to an output node 56 connecting the wind farm to a utility grid 55 via a rotational converter 57 and an optional step-up transformer 87 for matching the wind farm output voltage to the voltage present in the utility grid 55.

Figure 2:
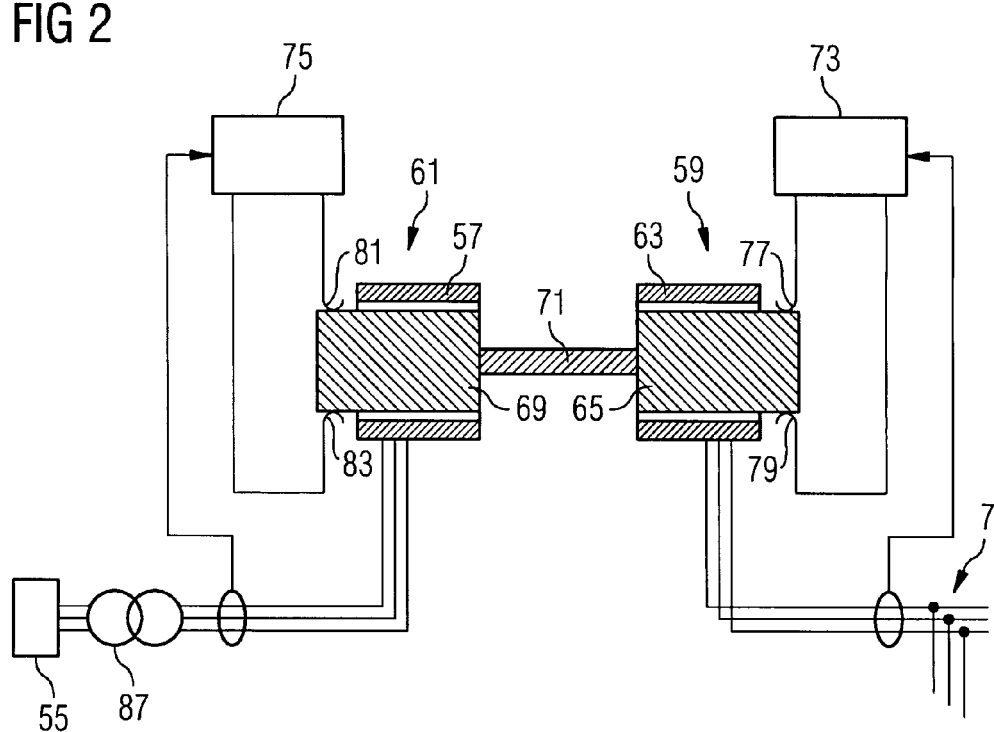
FIG. 2 schematically shows the rotational converter of the wind farm of FIG. 1.

The rotational converter 57 comprises an electric motor 59 having a stator 63 electrically connected to the internal node 7 and a rotor 65 rotatably mounted inside the stator (see FIG. 2). The generator 61 comprises a stator 67 which is electrically connected to the utility grid 55 and a rotor 69 rotatably mounted inside the stator 67. The rotors 65, 69 of the electrical motor 59 and the generator 61, respectively, are connected to each other by a rigid shaft which is rigidly fixed to both rotors 65, 69 so that both can only rotate together, i.e. with the same rotational frequency. Both the electrical motor 59 and the generator 61 are synchronous machines which means that their rotors can only rotate with the respective grid frequency or with an integer multiplicity of such a frequency depending on the number of pole pairs in the respective rotors. Usually the number of pole pairs is more than one, so that the grid frequency is an integer multiplicity of the rotor's rotational frequency.

The rotational converter 57 further comprises a start up motor 85 for starting up the converter 57 after a period of grid loss.

With the rotational converter 57 the electrical power of the wind farm's internal grid, which is present at the internal node 7, is transformed into a mechanical power of the rotating rotor 65 of the electrical motor 59. This mechanical power drives, via the rigid shaft 71, the rotor 69 of the generator 61. In the generator 61 the mechanical power is transformed back into electrical power and fed into the utility grid 55. By this construction a full galvanic separation of the wind farm's internal grid, represented by the internal node 7, and the utility grid 55 can be achieved. Hence, the quality of the electrical power at the wind farm's internal grid becomes irrelevant in relation to the specifications for the electricity at the utility grid 55, i.e. in relation to the grid code requirements provided by the utility operator. As a consequence, the wind farm's internal grid can be operated at any harmonic distortion and at any power factor, limited only by the properties of the used equipment. In addition, the rotor 69 of the generator 61 can serve as a spinning reserve.

As synchronous machines are used as the electric motor 59 and as the generator 61, respectively, both the rotor 69 of the generator 61 and the rotor 65 of the electric motor 59 rotate with a fixed frequency which is determined by the frequency of the electricity at the utility grid 55. As a consequence, the frequency at the wind farm's internal grid, which is determined by the rotational frequency of the rotor 65 in the electric motor 59, is an integer fraction or an integer multiplicity of the frequency in the utility grid 55, or both frequencies are exactly the same if the number of pole pairs in both rotors 65, 69 is the same. If the number of poles in the motor's rotor 65 is higher than in the generator's rotor 69, the frequency at the wind farm's internal grid is lower than at the utility grid 55. In contrast thereto, if the number of poles present in the motor's rotor 65 is higher than the number of poles present in the generator's rotor 69, the frequency at the internal grid of the wind farm is higher than the frequency at the utility grid 55.

In a synchronous machine the rotor is energised by an energising current through a rotor winding. Such an energising current is provided by control devices 73, 75 associated with the electric motor 59 and the generator 61, respectively. The control devices 73, 75 provide, via sliding contacts 77, 79, 81, 83, the energising current through the rotor 65 of the electric motor 59 and the rotor 69 of the generator 61, respectively.

At the utility grid side and at the internal grid side the phase and/or the voltage of the electricity in the respective grid are/is measured and fed into the control devices 73, 75. On the basis of the measured parameters, the control devices 73, 75 calculate a suitable energising current to achieve the required power factor, in particular in the case of the generator 61 the stator of which is connected to the utility grid 55 and has to fulfil the grid code requirements.

In addition, it is also desirable to control the power factor at the internal grid of the wind farm. Therefore, the energising current delivered to the rotor 65 of the electric motor can be controlled as well.

But not only the phase factor or the power factor can be controlled but also the active power delivered to the utility grid 55. Controlling the delivered active power can be achieved by controlling the torque of the rotor 69 in the generator 61 which depends on the polar wheel angle of the rotor 69 with respect to the rotating magnetic field in the stator 67. Thus, by controlling the polar wheel angle, the active power delivered to the utility grid 55 can be controlled. As with controlling the power factor, controlling the active power can be achieved by feeding suitable energising power to the rotor.

In the inventive wind farm the grid code requirements can be fulfilled at wind farm level in regard to "voltage control" and "reactive power control". The voltage control can be performed by simultaneously controlling the active power and the power factor of the electricity delivered to the utility grid.

The invention claimed is:
1. A wind farm comprising:
a wind turbine having a rotor mechanically coupled with a wind turbine generator for transforming mechanical power into electrical power, the generator comprising a generator output for putting out the electrical power;

a wind farm output node adapted to electrically couple the wind farm with a utility grid;

a converter having an electric motor with a stator and a rotor and a converter generator with a stator and a rotor, the stator of the motor is electrically coupled with the generator output and the stator of the converter generator is electrically coupled with the wind farm output node, and the rotor of the motor and the rotor of the converter generator are mechanically coupled to each other; and a control device connected to the electric motor and/or the converter generator and configured to produce control signals based on a request set value relating to the electrical power to dynamically control at least a reactive power to be output from the wind farm output node, and to output the control signals to the electric motor and/or the converter generator to control said reactive power by way of a controlled energizing current supplied by the control device to the rotor of the converter generator.

2. The wind farm as claimed in claim 1, wherein the electric motor is a synchronous motor and/or the converter generator is a synchronous generator.

3. The wind farm as claimed in claim 2, wherein the mechanical coupling is a rigid shaft.

4. The wind farm as claimed in claim 3, wherein each rotor comprises a plurality of poles and the number of poles in the rotor of the electrical motor is different to the number of poles in the rotor of the converter generator.

5. The wind farm as claimed in claim 4, wherein the energy converter comprises a start up motor.

6. The wind farm as claimed in claim 5, wherein a voltage transformer is interconnected between the converter generator and the wind farm output node.

7. The wind farm as claimed in claim 6, wherein the wind farm comprises a plurality of wind turbines and a wind farm grid with an internal node to which the generator outputs of all wind turbines are connected, and wherein the stator of the electric motor is electrically connected to the internal node.

8. The wind farm as claimed in claim 6, wherein the wind farm comprises a plurality of wind turbines and a plurality of energy converters, the stators of the electric motors of different energy converters are connected to generator outputs of different wind turbines and the stators of the converter generators are electrically connected to the wind farm output node.

9. The wind farm as claimed in claim 6, wherein
the wind farm comprises a plurality of wind turbines, and
the energy converter includes a plurality of electric motors,
stators of different electric motors are connected to generator outputs of different wind turbines; and
the mechanical coupling includes a plurality of mechanical coupling devices where each coupling device mechanically couples a rotor of one of the electric motors to the rotor of the converter generator.

10. The wind farm as claimed in claim 6, wherein the control device is further configured to dynamically control a reactive power at the internal node of the wind farm by way of a controlled energizing current supplied by the control device to the rotor of the motor.

11. A method to control reactive power in a wind farm, the method comprising:

mechanically coupling a rotor of a wind turbine with a wind turbine generator for transforming mechanical power into electrical power, the wind turbine generator comprising a generator output for outputting the electrical power;

electrically coupling an electrical output of the wind farm with a utility grid by way of a wind farm output node;

providing a converter comprising an electric motor with a stator and a rotor, and further comprising a converter generator with a stator and a rotor;

electrically coupling the stator of the motor with the wind turbine generator;

electrically coupling the stator of the converter generator with the wind farm output node;

mechanically coupling the rotor of the motor and the rotor of the converter generator to each other; and controlling an energizing current supplied by a control device to the converter generator to dynamically control at least a reactive power to be output from the wind farm output node.

12. The method of claim 11, further comprising controlling an energizing current supplied by the control device to the motor to dynamically control a reactive power at an internal node of the wind farm.

13. The method of claim 11, further comprising controlling a torque of the rotor of the converter generator to dynamically control an active power to be output from the wind farm output node.

14. The method of claim 13, wherein the controlling of the torque of the rotor of the converter generator to control the active power is based on a polar wheel angle of the rotor of the converter generator relative to a rotatable magnetic field in the stator of the converter generator.

* * * * *